United States Patent
Sano et al.

(10) Patent No.: US 6,818,054 B2
(45) Date of Patent: Nov. 16, 2004

(54) PROCESSES FOR PRODUCING PIGMENT DISPERSION AND INK COMPOSITION

(75) Inventors: Tsuyoshi Sano, Nagano-Ken (JP); Kiyohiko Takemoto, Nagano-Ken (JP); Kazuaki Watanabe, Nagano-Ken (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/374,516

(22) Filed: Feb. 26, 2003

(65) Prior Publication Data

US 2003/0188665 A1 Oct. 9, 2003

(30) Foreign Application Priority Data

Feb. 27, 2002 (JP) .......................... 2002-052392
Apr. 18, 2002 (JP) .......................... 2002-116692

(51) Int. Cl.$^7$ ............... C08K 5/00; C09D 11/00; C09D 17/00
(52) U.S. Cl. .............. 106/499; 106/31.6; 106/31.86; 106/31.89; 347/100; 428/195.1
(58) Field of Search .................. 106/499, 31.6, 106/31.86, 31.89; 347/100; 428/195.1

(56) References Cited

U.S. PATENT DOCUMENTS

| | | | |
|---|---|---|---|
| 5,085,698 A | 2/1992 | Ma et al. ............... 106/20 |
| 5,310,778 A | 5/1994 | Shor et al. .............. 524/556 |
| 5,656,071 A | * 8/1997 | Kappele et al. ......... 106/31.76 |
| 6,241,811 B1 | 6/2001 | Sano ....................... 106/31.85 |
| 6,538,049 B1 | * 3/2003 | Kappele et al. ........... 523/161 |

FOREIGN PATENT DOCUMENTS

| | | |
|---|---|---|
| EP | 001234859 A1 * | 8/2002 |
| JP | 56-147861 | 11/1981 |
| JP | 61-55548 | 11/1986 |
| JP | 4-227668 | 8/1992 |
| JP | 6-157954 | 6/1994 |
| WO | 98-44059 | 10/1998 |

OTHER PUBLICATIONS

English Abstract Of JP6–157954 dated Jun. 7, 1994.
English Abstract of JP4–227668 dated Aug. 17, 1992.
English Abstract of JP 56–147861 dated Nov. 17, 1981.
English Abstract of JP 61–55548 dated Nov. 28, 1986.
English Abstract of WO 98–44059 dated Oct. 8, 1998.

* cited by examiner

*Primary Examiner*—Anthony J. Green
(74) *Attorney, Agent, or Firm*—Ladas & Parry

(57) ABSTRACT

A process for producing a pigment dispersion is disclosed. This process comprises the steps of: providing a mixture consisting essentially of a pigment, a dispersant, a polysiloxane surfactant and/or an alkanediol, a polyhydric alcohol, and water; and dispersing the ingredients of the mixture in one another. A process for producing an ink composition is also disclosed wherein the above pigment dispersion is mixed with a member selected from the group consisting of water, a surfactant, a wetting agent, a pH adjustor, and mixtures thereof. This ink composition can realize good image quality.

23 Claims, No Drawings

PROCESSES FOR PRODUCING PIGMENT DISPERSION AND INK COMPOSITION

BACKGROUND OF THE INVENTION

1. Field of the Invention

The present invention relates to processes for producing a pigment dispersion and an ink composition.

2. Background Art

Pigments have been used as colorants in highly lightfast and highly waterfast ink compositions, especially ink compositions for ink jet recording. When a pigment is used as a colorant, an ink composition is prepared by mixing and dispersing the pigment, together with a dispersant, in water and the like to prepare a pigment dispersion and further mixing the pigment dispersion with water, a water-soluble organic medium and other ingredients.

For example, Japanese Patent Laid-Open No. 157954/1994 proposes an ink production process in which a pigment and a polymeric dispersant are subjected to a two-roll milling (a two-roll mill) device to prepare a pigment dispersion and then the pigment dispersant is dispersed in an aqueous carrier medium to give an ink composition. Japanese Patent Publication No. 55548/1986 also proposes an ink production process in which a polymer (a dispersant) previously prepared by polymerizing monomers is first provided, and the polymer, a pigment, and a water-soluble polyhydric alcohol (ethylene glycol) are dispersed with a ball mill or a sand mill to prepare a pigment dispersion from which an ink composition for ink jet recording is then prepared. Japanese Patent Laid-Open No. 227668/1992 proposes a production process of an ink composition. In this production process, a previously prepared block polymer is provided as a dispersant. The dispersant, a pigment, a water-soluble organic solvent, such as diethylene glycol, and water are dispersed with a horizontal Mini mill to prepare a dispersion which is then diluted to prepare an ink composition. Further, WO 98/44059 proposes an ink production process in which ingredients of a mixture containing a pigment, a dispersant, a specific alkyl ether compound, and a specific surfactant are dispersed in one another to prepare a pigment dispersion. On the other hand, a production process of a pigment dispersion, wherein ingredients of a mixture of a pigment, a dispersant, a polysiloxane surfactant and/or an alkanediol, a polyhydric alcohol, and water are dispersed in one another, has not been disclosed.

SUMMARY OF THE INVENTION

The present inventors have now succeeded in developing a production process of a pigment dispersion that can realize an ink composition which can yield good images. In particular, the present inventors have found that a pigment dispersion wherein, in dispersing a pigment with the aid of a dispersant, a specific compound is added to provide a pigment dispersion that can realize an ink composition which can form dots having a large diameter in a small amount of ink ejected on a recording medium and can effectively prevent feathering.

Accordingly, an object of the present invention is to provide a production process of a pigment dispersion that can realize an ink composition which can form dots having a large diameter in a small amount of ink ejected on a recording medium and can effectively prevent feathering.

According to one aspect of the present invention, there is provided a process for producing a pigment dispersion, comprising the steps of:

providing a mixture consisting essentially of a pigment, a dispersant, a polysiloxane surfactant and/or an alkanediol, a polyhydric alcohol, and water; and dispersing the mixture.

According to another aspect of the present invention, there is provided a process for producing an ink composition, comprising the steps of:

providing a mixture consisting essentially of a pigment, a dispersant, a polysiloxane surfactant and/or an alkanediol, a polyhydric alcohol, and water;

dispersing the mixture to prepare a pigment dispersion; and mixing the pigment dispersion with a member selected from the group consisting of water, a surfactant, a wetting agent, a pH adjustor, and mixtures thereof.

According to the present invention, in dispersing a pigment with the aid of a dispersant, a polysiloxane surfactant or an alkanediol is added. An ink composition using the pigment dispersion thus obtained, as compared with an ink composition prepared by dispersing a pigment with the aid of a dispersant to prepare a pigment dispersion and adding a polysiloxane surfactant or an alkanediol to the pigment dispersion, can advantageously yield dots having the same dot diameter in a smaller amount of ink ejected and can realize images having no significant feathering on recording media. In particular, the pigment dispersion according to the present invention is advantageous in that, when the recording medium is a gloss film, that is, a film comprising a white film as a substrate and a transparent coating provided on the surface of the substrate, dots having a relatively large diameter can be realized in a small amount of ink ejected.

DETAILED DESCRIPTION OF THE INVENTION

Production Process of Pigment Dispersion

A specific example of means for dispersing ingredients of the mixture of a pigment, a dispersant, a polysiloxane surfactant and/or an alkanediol, and a polyhydric alcohol is dispersing by a dispergator.

Specific examples of dispergators usable herein include a ball mill, a sand mill, an attritor, a roll mill, an agitator mill, a Mini mill, a Henschel mixer, a colloid mill, an ultrasonic homogenizer, a jet mill, an angmill, and a spike mill.

Conditions for dispersing may be properly determined depending upon, for example, properties and addition amounts of ingredients in the pigment dispersion. In an embodiment of the production process according to the present invention, for example, a pigment, a dispersant, a polysiloxane surfactant and/or an alkanediol, and water, together with glass beads (diameter: 1.7 mm, amount: 1.5 times (by weight) larger than the mixture), are charged into a sand mill (manufactured by Yasukawa Seisakusho) where these ingredients are mixed and dispersed in one another at room temperature. In another embodiment of the production process according to the present invention, Mini mill 100 (Eiger Machinery Inc., Bensenbille Ill.) is used as the dispergator, and the ingredients of the above pigment dispersion are mixed and dispersed at a rotating speed of 3,000 to 4,000 rpm.

(1) Polysiloxane Surfactant

In the present invention, a polysiloxane surfactant is utilized. Preferred polysiloxane surfactants include compounds represented by formula (I) or (II).

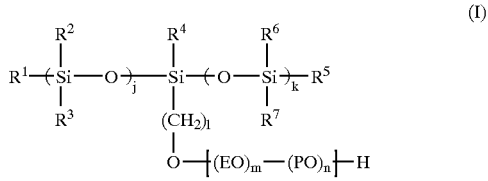

(I)

wherein
$R^1$ to $R^7$ each independently represent a $C_{1-6}$ alkyl group,
j, k, and l are each independently an integer of one or more,
EO represents an ethyleneoxy group,
PO represents a propyleneoxy group,
m and n are an integer of 0 (zero) or more, provided that m+n is an integer of one or more, and
EO and PO may be arranged, regardless of order in the brackets of formula (I), randomly or as blocks joined together; or

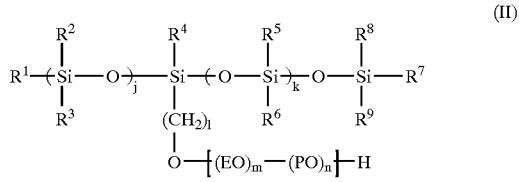

(II)

wherein
$R^1$ to $R^9$ each independently represent a $C_{1-6}$ alkyl group,
j, k, and l are each independently an integer of one or more,
EO represents an ethyleneoxy group,
PO represents a propyleneoxy group,
m and n are an integer of 0 (zero) or more, provided that m+n is an integer of one or more, and
EO and PO may be arranged, regardless of order in the brackets of formula (II), randomly or as blocks joined together.

According to a preferred embodiment of the present invention, the compounds of formula (I) wherein of $R^1$ to $R^7$ represent a methyl group; j is one; k is one; l is one; m is an integer of one or more; and n is 0 (zero) are preferable.

The compounds of formula (I) are commercially available and can be utilized in the present invention. For example, BYK-347 (tradename) available from Bik-Chemie Japan K.K. may be utilized.

In formula (II), $R^1$ to $R^9$ each independently represent a $C_{1-6}$ alkyl group, preferably a methyl group. j and k each independently are an integer of one or more, preferably one or 2. m and n are an integer of 0 (zero) or more, provided that m+n is an integer of one or more, preferably an integer of 2 to 4.

The compounds of formula (II) wherein all of $R^1$ to $R^9$ represent a methyl group; j is 2; k is one; l is one; m is an integer of one or more; and n is 0 (zero) are preferable.

The compounds of the formula (II) are commercially available and can be utilized in the present invention. For example, BYK-345, BYK-346, and BYK-348 (tradenames) available from Bik-Chemie Japan K.K. may be utilized.

While the amount of the polysiloxane surfactant added may not be limited, it is preferably 0.03 to 3% by weight, more preferably about 0.1 to 2% by weight, and still more preferably about 0.3 to 1% by weight, based on the total amount of the pigment dispersion.

(2) Alkanediol

An alkanediol is utilized in the present invention. The alkanediol is preferably a 1,2-alkanediol, more preferably 1,2-hexanediol.

While the amount of the alkanediol added may not be limited, it is preferably about 0.5 to 20% by weight, more preferably about 1 to 15% by weight, based on the total amount of the pigment dispersion.

(3) Pigment

Inorganic pigments or organic pigments can be used as the pigment in the present invention. Inorganic pigments usable herein include, in addition to titanium oxide and iron oxide, carbon blacks produced by conventional processes, such as contact, furnace, and thermal processes. Organic pigments usable herein include azo pigments (including azo lakes, insoluble azo pigments, condensed azo pigments, and chelate azo pigments), polycyclic pigments (for example, phthalocyanine, perylene, perinone, anthraquinone, quinacridone, dioxazine, thioindigo, isoindolinone, and quinophthalone pigments), chelate pigments (for example, basic pigment-type chelate pigments and acid pigment-type chelate pigments), nitro pigments, nitroso pigments, and aniline black.

In the present invention, pigments having the following color index numbers can be utilized.

Color pigments include: C.I. Pigment Red 5, C.I. Pigment Red 7, C.I. Pigment Red 12, C.I. Pigment Red 41, C.I. Pigment Red 48, C.I. Pigment Red 48 (Ca), C.I. Pigment Red 48 (Mn), C.I. Pigment Red 54, C.I. Pigment Red 57, C.I. Pigment Red 57 (Ca), C.I. Pigment Red 57:1, C.I. Pigment Red 58, C.I. Pigment Red 63, C.I. Pigment Red 68, C.I. Pigment Red 81, C.I. Pigment Red 112, C.I. Pigment Red 122, C.I. Pigment Red 123, C.I. Pigment Red 168, C.I. Pigment Red 184, C.I. Pigment Red 202, and C.I. Pigment Red 209; C.I. Pigment Violet 19; C.I. Pigment Blue 1, C.I. Pigment Blue 2, C.I. Pigment Blue 3, C.I. Pigment Blue 15:3, C.I. Pigment Blue 15:4, C.I. Pigment Blue 15:34, C.I. Pigment Blue 16, C.I. Pigment Blue 17, C.I. Pigment Blue 22, and C.I. Pigment Blue 60; and C.I. Pigment Yellow 13, C.I. Pigment Yellow 17, C.I. Pigment Yellow 74, C.I. Pigment Yellow 83, C.I. Pigment Yellow 93, C.I. Pigment Yellow 95, C.I. Pigment Yellow 109, C.I. Pigment Yellow 110, C.I. Pigment Yellow 128, C.I. Pigment Yellow 138, C.I. Pigment Yellow 150, C.I. Pigment Yellow 154, C.I. Pigment Yellow 155, C.I. Pigment Yellow 180, and C.I. Pigment Yellow 185.

Black pigments include: No. 33, No. 40, No. 45, No. 52, No. 900, No. 2300, No. 2200 B, MCF 88, MA 7, MA 8, and MA 100, manufactured by Mitsubishi Chemical Corporation; Raven 5750, Raven 5250, Raven 5000, Raven 3500, Raven 1255, and Raven 700, manufactured by Columbian Carbon Co., Ltd.; Regal 400 R, Regal 330 R. Regal 1660 R, Mogul L, Monarch 700, Monarch 800, Monarch 880, Monarch 900, Monarch 1000, Monarch 1100, Monarch 1300, and Monarch 1400, manufactured by Cabot Corporation; and Color Black FW 1, Color Black FW 2, Color Black FW 2 V, Color Black FW 18, Color Black FW 200, Color Black S 150, Color Black S 160, Color Black S 170, Printex 35, Printex U. Printex V, Printex 140 U, Special Black 6, Special Black 5, Special Black 4 A, and Special Black 4, manufactured by Degussa.

While the particle diameter of the pigment is not particularly limited, it is preferably not more than about 10 μm, more preferably not more than about 0.1 μm. The amount of the pigment added may be properly determined. The amount of the pigment added, however, is preferably about 1 to 30% by weight, more preferably about 2 to 20% by weight, based on the total amount of the pigment dispersion.

(4) Dispersant

For example, polymeric compounds may be mentioned as the dispersant usable in the present invention. Specific examples of preferred polymeric compounds include naturally occurring polymers, for example, proteins, such as glue, gelatin, casein, and albumin, naturally occurring rubbers, such as gum arabic and tragacanth, glucosides, such as saponin, alginic acid and alginic acid derivatives, such as propylene glycol alginate, triethanolamine alginate, ammonium alginate, and sodium alginate, and cellulose derivatives, such as methylcellulose, carboxymethylcellulose, hydroxyethylcellulose, and ethylhydroxyethylcellulose.

Specific examples of preferred polymeric compounds include synthetic polymers, and examples thereof include: polyvinyl alcohols; polyvinyl pyrrolidones; acrylic resins, such as polyacrylic acid, acrylic acid/acrylonitrile copolymer, potassium acrylate/acrylonitrile copolymer, vinyl acetate/acrylic ester copolymer, and acrylic acid/alkyl acrylate copolymer; styrene/acrylic acid resins, such as styrene/acrylic acid copolymer, styrene/methacrylic acid/ alkyl acrylate copolymer, styrene/α-methylstyrene/acrylic acid copolymer, and styrene/α-methylstyrene/acrylic acid/ alkyl acrylate copolymer; styrene/maleic acid copolymer; styrene/maleic anhydride copolymer; vinylnaphthalene/ acrylic acid copolymer; vinyl acetate/ethylene copolymer, vinyl acetate/fatty acid vinylethylene copolymer, and vinyl acetate/maleic ester copolymer; and salts of the above polymers. Among them, a copolymer of a monomer having a hydrophobic group with a monomer having a hydrophilic group and a polymer of a monomer having both a hydrophobic group and a hydrophilic group are particularly preferred. Examples of the above-described salts include salts with diethylamine, ammonia, ethylamine, triethylamine, propylamine, isopropylamine, dipropylamine, butylamine, isobutylamine, triethanolamine, diethanolamine, aminomethylpropanol, morpholine and the like. The average molecular weight of the polymeric compound is preferably about 3,000 to 30,000, more preferably about 5,000 to 15,000.

While the amount of the dispersant added may not be limited, it is preferably about 0.2 to 30% by weight, more preferably about 0.4 to 20% by weight, based on the total amount of the pigment dispersant.

(5) Polyhydric Alcohol

Specific examples of polyhydric alcohols usable in the present invention include ethylene glycol, diethylene glycol, triethylene glycol, polyethylene glycol, propylene glycol, polypropylene glycol, butylene glycol, 1,2,6-hexanetriol, thiodiglycol, hexylene glycol, glycerin, trimethylolethane, and trimethylolpropane. Preferably, the polyhydric alcohol is selected from the group consisting of ethylene glycol, diethylene glycol, glycerin, and a mixture of two or more of these polyhydric alcohols. The polyhydric alcohols may be the same as those which will be described later as wetting agents to be added to the ink composition.

While the amount of the polyhydric alcohol added may not be limited, it is preferably about 1 to 20% by weight, more preferably about 5 to 10% by weight, based on the total amount of the pigment dispersion.

(6) Water

Water may be pure water obtained by ion exchange, ultrafiltration, reverse osmosis, distillation or the like, or ultrapure water. Further, in the present invention, if necessary, a surfactant may be added to water. Specific examples of surfactants usable herein may be the same as those that are added to an ink composition which will be described later.

Production Process of Ink Composition

In the production process of an ink composition according to the present invention, the ingredients and production process of a pigment dispersion may be the same as those described above in connection with the production process of a pigment dispersion. The pigment dispersion may be mixed with a member selected from the group consisting of water, a surfactant, a wetting agent, a pH adjustor, and mixtures thereof by the same method as used in dispersing in the above-described production process of a pigment dispersion. In a preferred embodiment of the present invention, the production process further comprises the step of filtering the mixture after the step of mixing.

In a preferred embodiment of the present invention, a polysiloxane surfactant and/or an alkanediol is further added to the pigment dispersion. Polysiloxane surfactants and alkanediols usable herein may be the same as those described above in connection with the production process of a pigment dispersion.

The amount of the polysiloxane surfactant added is preferably in the range of about 0.03 to 3% by weight, more preferably in the range of about 0.1 to 2% by weight, still more preferably in the range of about 0.3 to 1% by weight, based on the total amount of the ink composition.

The amount of the alkanediol added is preferably in the range of about 0.5 to 20% by weight, more preferably in the range of about 1 to 15% by weight, based on the total amount of the ink composition.

(1) Surfactant

In the production process of an ink composition according to the present invention, preferably, a surfactant is added. Any surfactant commonly added to ink compositions may be utilized. Examples of surfactants usable herein include: anionic surfactants, for example, sodium dodecylbenzenesulfonate, sodium laurylate, and ammonium salts of polyoxyethylene alkyl ether sulfates; nonionic surfactants, for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides; and acetylene glycol surfactants. Specific examples of preferred acetylene glycol surfactants include 2,4,7,9-tetramethyl-5-decyne-4,7-diol, 3,6-dimethyl-4-octyne-3,6-diol, and 3,5-dimethyl-1-hexyn-3-ol. Commercially available acetylene glycol surfactants may also be utilized. Specific examples of commercially available acetylene glycol surfactants include: Surfynol 82, Surfynol 104, Surfynol 440, Surfynol 465, Surfynol 485, and Surfynol TG (tradenames) (all the above products being available from Air Products and Chemicals Inc.); and Olfine STG and Olfine E 1010 (tradenames) (both the products being available from Nissin Chemical Industry Co., Ltd.).

The amount of the surfactant added is preferably in the range of about 0.01 to 10% by weight, more preferably in the range of about 0.1 to 5% by weight, based on the total amount of the ink composition.

(2) Wetting Agent

In the production process of an ink composition according to the present invention, preferably, a wetting agent is added. The addition of the wetting agent is effective, for example, in preventing nozzle clogging of a recording head. Specific examples of preferred wetting agents include: polyhydric alcohols, such as ethylene glycol, diethylene glycol, triethylene glycol, polyethylene glycol, propylene glycol, polypropylene glycol, butylene glycol, 1,2,6-hexanetriol, thiodiglycol, hexylene glycol, glycerin, trimethylolethane, and trimethylolpropane; urea; 2-pyrrolidone; 1,3-dimethyl-2-imidazole; imidazole; and N-methyl-2-pyrrolidone.

While the amount of the wetting agent added may not be limited, it is about 0.5 to 40% by weight, preferably about 2 to 20% by weight, based on the total amount of the ink composition.

(3) Saccharide

In the production process of an ink composition according to the present invention, preferably, a saccharide is added. Specific examples of saccharides include: monosaccharides; disaccharides; oligosaccharides including trisaccharides and tetrasaccharides; and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein means saccharides in the broad sense as including substances which exist widely in the world of nature, such as cellulose.

The amount of the saccharide added is about 0.5 to 40% by weight, preferably about 2 to 20% by weight, based on the total amount of the ink composition.

(4) pH Adjustor

In the production process of an ink composition according to the present invention, preferably, a pH adjustor is added. The addition of the pH adjustor can further improve the dispersion stability of the pigment in the ink composition. Specific examples of pH adjustors include: alkali metal salts, such as sodium hydroxide, potassium hydroxide, lithium hydroxide, sodium carbonate, sodium hydrogencarbonate, potassium carbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogentartrate; and amines, such as ammonia, methylamine, ethylamine, diethylamine, tris(hydroxymethyl)aminomethane hydrochloride, triethanolamine, morpholine, and propanolamine.

The amount of the pH adjustor added is about 0.01 to 5% by weight, preferably about 0.1 to 3% by weight, based on the total amount of the ink composition.

(5) Other Ingredients

In the production process of an ink composition according to the present invention, other ingredients may be added. Specific examples of other ingredients include antioxidants, ultraviolet absorbers, electric conductivity adjustors, pH adjustors, surface tension modifiers, oxygen absorbers, and chelating agents, for example, ethylenediaminetetraacetic acid and disodium ethylenediaminetetraacetate. Specific examples of antioxidants and ultraviolet absorbers include Tinuvin 328, Tinuvin 900, Tinuvin 1130, Tinuvin 384, Tinuvin 292, Tinuvin 123, Tinuvin 144, Tinuvin 622, Tinuvin 770, Irgacor 252, Irgacor 153, Irganox 1010, Irganox 1076, Irganox 1035, and MD 1024, manufactured by Ciba-Geigy.

EXAMPLES

The following examples further illustrate the present invention but are not intended to limit it. In the following formulations, "EDTA" represents disodium ethylenediaminetetraacetate.

Example A

Example A1

Preparation of Pigment Dispersion A1

Ingredients indicated below were mixed together according to the following formulation, and the ingredients of the mixture, together with glass beads (diameter: 1.7 mm, amount: 1.5 times (by weight) larger than the mixture), were dispersed in one another at room temperature for one hr in a sand mill (manufactured by Yasukawa Seisakusho) to prepare a pigment dispersion A1.

| | |
|---|---|
| C.I. Pigment Blue 15:3 | 15 wt % |
| Styrene-acrylic acid copolymer (dispersant: molecular weight 7,500) | 5 wt % |
| BYK 347 (polysiloxane surfactant, manufactured by Bik-Chemie Japan K.K.) | 0.5 wt % |
| Glycerin | 10 wt % |
| Pure water | Balance |

Preparation of Ink Composition A1

Ingredients indicated below were stirred according to the following formulation at room temperature for 20 min. The mixture was filtered through a 5-μm membrane filter to prepare an ink composition A1.

| | |
|---|---|
| Pigment dispersion A1 | 20 wt % |
| Glycerin (15 wt % in total based on total amount of ink composition) | 13 wt % |
| Ethylene glycol | 5 wt % |
| 1,2-Hexanediol | 3 wt % |
| BYK 347 (0.5 wt % in total based on total amount of ink composition) | 0.4 wt % |
| Triethanolamine | 0.8 wt % |
| EDTA | 0.05 wt % |
| Pure water | Balance |

Example A2

Preparation of Pigment Dispersion A2

A pigment dispersion A2 was prepared in the same manner as in Example A1, except that the formulation of the mixture was as follows.

| | |
|---|---|
| C.I. Pigment Red 122 | 15 wt % |
| Styrene-acrylic acid copolymer (dispersant: molecular weight 7,500) | 7.5 wt % |
| BYK 347 | 0.5 wt % |
| Glycerin | 10 wt % |
| Pure water | Balance |

Preparation of Ink Composition A2

An ink composition A2 was prepared in the same manner as in Example A1, except that the formulation of the mixture was as follows.

| | |
|---|---|
| Pigment dispersion A2 | 20 wt % |
| Glycerin (15 wt % in total based on total amount of ink composition) | 13 wt % |
| Diethylene glycol | 5 wt % |
| 1,2-Hexanediol | 3 wt % |
| BYK 347 (0.5 wt % in total based on total amount of ink composition) | 0.4 wt % |
| Triethanolamine | 0.5 wt % |
| EDTA | 0.05 wt % |
| Pure water | Balance |

Example A3

Preparation of Pigment Dispersion A3

Ingredients indicated below were mixed together. The mixture was charged into Mini mill 100 (Eiger Machinery Inc., Bensenbille Ill.), and the ingredients of the mixture were dispersed in one another at 3000 rpm for 2 hr. Thus, a pigment dispersion A3 was prepared.

| | |
|---|---|
| Carbon black MA 7 (manufactured by Mitsubishi Chemical Corporation) | 15 wt % |
| Styrene-acrylic acid copolymer (dispersant: molecular weight 7,500) | 5 wt % |
| BYK 347 | 0.5 wt % |
| Glycerin | 10 wt % |
| Pure water | Balance |

Preparation of Ink Composition A3

An ink composition A3 was prepared in the same manner as in Example A1, except that the formulation of the mixture was as follows.

| | |
|---|---|
| Pigment dispersion A3 | 20 wt % |
| Glycerin (15 wt % in total based on total amount of ink composition) | 13 wt % |
| Diethylene glycol | 5 wt % |
| 1,2-Hexanediol | 3 wt % |
| BYK 347 (0.5 wt % in total based on total amount of ink composition) | 0.4 wt % |
| Triethanolamine | 0.7 wt % |
| EDTA | 0.05 wt % |
| Pure water | Balance |

Example A4

Preparation of Pigment Dispersion A4

A pigment dispersion A4 was prepared in the same manner as in Example A1, except that the formulation of the mixture was as follows.

| | |
|---|---|
| Carbon black MA 7 | 15 wt % |
| Styrene-acrylic acid copolymer (dispersant: molecular weight 7,500) | 5 wt % |
| BYK 348 | 0.5 wt % |
| Glycerin | 10 wt % |
| Pure water | Balance |

Preparation of Ink Composition A4

An ink composition A4 was prepared in the same manner as in Example A1, except that the formulation of the mixture was as follows.

| | |
|---|---|
| Pigment dispersion A4 | 20 wt % |
| Glycerin (15 wt % in total based on total amount of ink composition) | 13 wt % |
| Diethylene glycol | 5 wt % |
| 1,2-Hexanediol | 3 wt % |
| BYK 348 (0.5 wt % in total based on total amount of ink composition) | 0.4 wt % |
| Triethanolamine | 0.7 wt % |
| EDTA | 0.05 wt % |
| Pure water | Balance |

Example A5

Preparation of Pigment Dispersion A5

A pigment dispersion A5 was prepared in the same manner as in Example A1, except that the formulation of the mixture was as follows.

| | |
|---|---|
| C.I. Pigment Blue 15:3 | 15 wt % |
| Styrene-acrylic acid copolymer (dispersant: molecular weight 7,500) | 5 wt % |
| BYK 347 | 0.3 wt % |
| Olfine E 1010 (acetylene glycol surfactant, manufactured by Nissin Chemical Industry Co., Ltd.) | 0.6 wt % |
| Glycerin | 10 wt % |
| Pure water | Balance |

Preparation of Ink Composition A5

An ink composition A5 was prepared in the same manner as in Example A1, except that the formulation of the mixture was as follows.

| | |
|---|---|
| Pigment dispersion A5 | 20 wt % |
| Glycerin (15 wt % in total based on total amount of ink composition) | 13 wt % |
| Ethylene glycol | 5 wt % |
| 1,2-Hexanediol | 3 wt % |
| BYK 347 (0.3 wt % in total based on total amount of ink composition) | 0.24 wt % |
| Olfine E 1010 (0.6 wt % in total based on total amount of ink composition) | 0.48 wt % |
| Triethanolamine | 0.8 wt % |
| EDTA | 0.05 wt % |
| Pure water | Balance |

Example A6

Preparation of Pigment Dispersion A6

A pigment dispersion A6 was prepared in the same manner as in Example A1, except that the formulation of the mixture was as follows.

| | |
|---|---|
| C.I. Pigment Yellow 74 | 15 wt % |
| Styrene-acrylic acid copolymer (dispersant: molecular weight 7,500) | 5 wt % |
| 1,2-Hexanediol | 5 wt % |
| BYK 347 | 0.5 wt % |
| Glycerin | 10 wt % |
| Pure water | Balance |

Preparation of Ink Composition A6

An ink composition A6 was prepared in the same manner as in Example A1, except that the formulation of the mixture was as follows.

| | |
|---|---|
| Pigment dispersion A6 | 20 wt % |
| Glycerin (15 wt % in total based on total amount of ink composition) | 13 wt % |
| Ethylene glycol | 6 wt % |
| 1,2-Hexanediol (3 wt % in total based on total amount of ink composition) | 2 wt % |
| BYK 347 (0.5 wt % in total based on total amount of ink composition) | 0.4 wt % |
| Triethanolamine | 0.7 wt % |
| EDTA | 0.05 wt % |
| Pure water | Balance |

Comparative Example A1

Preparation of Pigment Dispersion A7

A pigment dispersion A7 was prepared in the same manner as in Example A1, except that the formulation of the mixture was as follows.

| | |
|---|---|
| C.I. Pigment Blue 15:3 | 15 wt % |
| Styrene-acrylic acid copolymer (dispersant: molecular weight 7,500) | 5 wt % |
| Glycerin | 10 wt % |
| Pure water | Balance |

Preparation of Ink Composition A7

An ink composition A7 was prepared in the same manner as in Example A1, except that the formulation of the mixture was as follows.

| | |
|---|---|
| Pigment dispersion A7 | 20 wt % |
| Glycerin (15 wt % in total based on total amount of ink composition) | 13 wt % |
| Ethylene glycol | 5 wt % |
| 1,2-Hexanediol | 3 wt % |
| BYK 347 | 0.5 wt % |
| Triethanolamine | 0.8 wt % |
| EDTA | 0.05 wt % |
| Pure water | Balance |

Comparative Example A2

Preparation of Pigment Dispersion A8

A pigment dispersion A8 was prepared in the same manner as in Example A1, except that the formulation of the mixture was as follows.

| | |
|---|---|
| Carbon black MA 7 | 15 wt % |
| Styrene-acrylic acid copolymer (dispersant: molecular weight 7,500) | 5 wt % |
| Glycerin | 10 wt % |
| Pure water | Balance |

Preparation of Ink Composition A8

An ink composition A8 was prepared in the same manner as in Example A1, except that the formulation of the mixture was as follows.

| | |
|---|---|
| Pigment dispersion A8 | 20 wt % |
| Glycerin (15 wt % in total based on total amount of ink composition) | 13 wt % |
| Diethylene glycol | 5 wt % |
| 1,2-Hexanediol | 3 wt % |
| BYK 347 | 0.5 wt % |
| Triethanolamine | 0.7 wt % |
| EDTA | 0.05 wt % |
| Pure water | Balance |

Evaluation Test A

An ink jet printer MJ-930C manufactured by Seiko Epson Corp. was loaded with each of the ink compositions A1 to A8, and printing on recording media was carried out. The prints were tested for the following evaluation items. The amount of ink ejected was constant and was 0.023 μg per dot. The results of the evaluation tests were as shown in Table 1 below.

Evaluation A1: Filling Test

A full density blotted image (100% duty) of 50 point in length and 200 point in breadth was printed on a specialty gloss film (manufactured by Seiko Epson Corp.) which is a specialty recording medium for ink jet recording. The prints were evaluated for evenness of the blotted image portion. When the blotted image is not even, a white streak is formed along a scanning line. Therefore, the print was visually inspected for the white streak. The results were evaluated according to the following criteria.

Evaluation Criteria

A: There was no white streak, and blotted image could be evenly formed.

B: White streaks were formed in a part of the blotted image.

C: White streak, were formed on the whole blotted image, and blotted image was harsh.

Evaluation A2: Test on Feathering

Characters in 4 point, 10 point, and 20 point and a full density blotted image of 50 point in length and 200 point in breadth were printed on the following printing papers. The prints thus obtained were tested for feathering at the edge of the characters and the blotted images, and the results were evaluated according to the following criteria. The following five printing papers generally called plain paper were used as the printing paper.

Xerox P (a product of Xerox Corp.)

Xerox 4024 (a product of Xerox Corp.)

Xerox R (a product of Xerox Corp.)

Ricopy 6200 (a product of Ricoh Co., Ltd.)

Neenah Bond (a product of Kimberly-Clark)

Evaluation Criteria

A: Irrespective of the type of paper, prints were free from feathering and had good quality.

B: For some type of paper, feathering occurred.

C: Irrespective of the type of paper, feathering occurred in all of the evaluation papers.

TABLE 1

| Example/Evaluation test | A1 | A2 |
|---|---|---|
| Example A1 | A | A |
| Example A2 | A | A |
| Example A3 | A | A |
| Example A4 | A | A |
| Example A5 | A | A |
| Example A6 | A | A |
| Comparative Example A1 | B | B |
| Comparative Example A2 | B | B |

Example B

Example B1

Preparation of Pigment Dispersion B1

Ingredients indicated below were mixed together according to the following formulation, and the ingredients of the mixture, together with glass beads (diameter: 1.7 mm, amount: 1.5 times (by weight) larger than the mixture), were dispersed in one another at room temperature for one hr in a sand mill (manufactured by Yasukawa Seisakusho) to prepare a pigment dispersion B1.

| | |
|---|---|
| C.I. Pigment Blue 15:3 | 15 wt % |
| Styrene-acrylic acid copolymer (dispersant: molecular weight 7,500) | 5 wt % |
| 1,2-Hexanediol | 5 wt % |
| BYK 348 (polysiloxane surfactant, manufactured by Bik-Chemie Japan K.K.) | 0.5 wt % |
| Glycerin | 10 wt % |
| Pure water | Balance |

Preparation of Ink Composition B1

Ingredients indicated below were stirred according to the following formulation at room temperature for 20 min. The mixture was filtered through a 5-pm membrane filter to prepare an ink composition B1.

| | |
|---|---|
| Pigment dispersion B1 | 20 wt % |
| Glycerin (15 wt % in total based on total amount of ink composition) | 13 wt % |
| 2-Pyrrolidone | 2 wt % |
| Ethylene glycol | 5 wt % |
| 1,2-Hexanediol (3 wt % in total based on total amount of ink composition) | 2 wt % |
| BYK 348 (0.5 wt % in total based on total amount of ink composition) | 0.4 wt % |
| Triethanolamine | 0.8 wt % |
| EDTA | 0.05 wt % |
| Pure water | Balance |

Example B2

Preparation of Pigment Dispersion B2

Ingredients indicated below were mixed together. The mixture was charged into Mini mill 100 (Eiger Machinery Inc., Bensenbille Ill.), and the ingredients of the mixture were dispersed in one another at 3000 rpm for 2 hr. Thus, a pigment dispersion B2 was prepared.

| | |
|---|---|
| Carbon black MA 7 (manufactured by Mitsubishi Chemical Corporation) | 15 wt % |
| Styrene-acrylic acid copolymer (dispersant: molecular weight 7,500) | 5 wt % |
| 1,2-Hexanediol | 5 wt % |
| Olfine E 1010 (acetylene glycol surfactant, manufactured by Nissin Chemical Industry Co., Ltd.) | 1 wt % |
| Glycerin | 10 wt % |
| Pure water | Balance |

Preparation of Ink Composition B2

An ink composition B2 was prepared in the same manner as in Example B1, except that the formulation of the mixture was as follows.

| | |
|---|---|
| Pigment dispersion B2 | 20 wt % |
| Glycerin (15 wt % in total based on total amount of ink composition) | 13 wt % |
| 2-Pyrrolidone | 2 wt % |
| Diethylene glycol | 5 wt % |
| 1,2-Hexanediol (3 wt % in total based on total amount of ink composition) | 2 wt % |
| Olfine E 1010 (1 wt % in total based on total amount of ink composition) | 0.8 wt % |
| Triethanolamine | 0.7 wt % |
| EDTA | 0.05 wt % |
| Pure water | Balance |

Example B3

Preparation of Pigment Dispersion B3

A pigment dispersion B3 was prepared in the same manner as in Example B1, except that the formulation of the mixture was as follows.

| | |
|---|---|
| Carbon black MA 7 | 15 wt % |
| Styrene-acrylic acid copolymer (dispersant: molecular weight 7,500) | 5 wt % |
| 1,2-Hexanediol | 5 wt % |
| BYK 348 | 0.5 wt % |
| Glycerin | 10 wt % |
| Pure water | Balance |

Preparation of Ink Composition B3

An ink composition B3 was prepared in the same manner as in Example B1, except that the formulation of the mixture was as follows.

| | |
|---|---|
| Pigment dispersion B3 | 20 wt % |
| Glycerin (15 wt % in total based on total amount of ink composition) | 13 wt % |
| 2-Pyrrolidone | 2 wt % |
| Diethylene glycol | 5 wt % |
| 1,2-Hexanediol (3 wt % in total based on total amount of ink composition) | 2 wt % |
| BYK 348 (0.5 wt % in total based on total amount of ink composition) | 0.4 wt % |
| Triethanolamine | 0.7 wt % |
| EDTA | 0.05 wt % |
| Pure water | Balance |

Example B4

Preparation of Pigment Dispersion B4

A pigment dispersion B4 was prepared in the same manner as in Example B1, except that the formulation of the mixture was as follows.

| | |
|---|---|
| C.I. Pigment Yellow 74 | 15 wt % |
| Styrene-acrylic acid copolymer (dispersant: molecular weight 7,500) | 5 wt % |
| 1,2-Hexanediol | 5 wt % |
| BYK 347 (polysiloxane surfactant, manufactured by Bik-Chemie Japan K.K.) | 0.5 wt % |
| Glycerin | 10 wt % |
| Pure water | Balance |

Preparation of Ink Composition B4

An ink composition B4 was prepared in the same manner as in Example B1, except that the formulation of the mixture was as follows.

| | |
|---|---|
| Pigment dispersion B4 | 20 wt % |
| Glycerin (15 wt % in total based on total amount of ink composition) | 13 wt % |
| 2-Pyrrolidone | 2 wt % |
| Ethylene glycol | 6 wt % |
| 1,2-Hexanediol (4 wt % in total based on total amount of ink composition) | 3 wt % |
| BYK 347 (0.5 wt % in total based on total amount of ink composition) | 0.4 wt % |
| Triethanolamine | 0.7 wt % |
| EDTA | 0.05 wt % |
| Pure water | Balance |

Comparative Example B1

Preparation of Pigment Dispersion B5

A pigment dispersion B5 was prepared in the same manner as in Example B1, except that the formulation of the mixture was as follows.

| | |
|---|---|
| C.I. Pigment Blue 15:3 | 15 wt % |
| Styrene-acrylic acid copolymer (dispersant: molecular weight 7,500) | 5 wt % |
| Glycerin | 10 wt % |
| Pure water | Balance |

Preparation of Ink Composition B5

An ink composition B5 was prepared in the same manner as in Example B1, except that the formulation of the mixture was as follows.

| | |
|---|---|
| Pigment dispersion B5 | 20 wt % |
| Glycerin (15 wt % in total based on total amount of ink composition) | 13 wt % |
| 2-Pyrrolidone | 2 wt % |
| Ethylene glycol | 5 wt % |
| 1,2-Hexanediol | 3 wt % |
| BYK 348 | 0.5 wt % |
| Triethanolamine | 0.8 wt % |
| EDTA | 0.05 wt % |
| Pure water | Balance |

Comparative Example B2

Preparation of Pigment Dispersion B6

A pigment dispersion B6 was prepared in the same manner as in Example B1, except that the formulation of the mixture was as follows.

| | |
|---|---|
| Carbon black MA 7 | 15 wt % |
| Styrene-acrylic acid copolymer (dispersant: molecular weight 7,500) | 5 wt % |
| Glycerin | 10 wt % |
| Pure water | Balance |

Preparation of Ink Composition B6

An ink composition B6 was prepared in the same manner as in Example B1, except that the formulation of the mixture was as follows.

| | |
|---|---|
| Pigment dispersion B6 | 20 wt % |
| Glycerin (15 wt % in total based on total amount of ink composition) | 13 wt % |
| 2-Pyrrolidone | 2 wt % |
| Diethylene glycol | 5 wt % |
| 1,2-Hexanediol | 3 wt % |
| BYK 348 | 0.5 wt % |
| Triethanolamine | 0.7 wt % |
| EDTA | 0.05 wt % |
| Pure water | Balance |

Evaluation Test B

An ink jet printer MJ-930C manufactured by Seiko Epson Corp. was loaded with each of the ink compositions B1 to B6, and printing on recording media was carried out. The prints were tested for the following evaluation items. The amount of ink ejected was constant and was 0.023 μg per dot. The results of the evaluation tests were as shown in Table 2 below.

Evaluation B1: Filling Test

A full density blotted image (100% duty) of 50 point in length and 200 point in breadth was printed on a specialty gloss film (manufactured by Seiko Epson Corp.) which is a specialty recording medium for ink jet recording. The prints were evaluated for evenness of the blotted image portion. When the blotted image is not even, a white streak is formed along a scanning line. Therefore, the print was visually inspected for the white streak. The results were evaluated according to the following criteria.

Evaluation Criteria

A: There was no white streak, and blotted image could be evenly formed.

B: White streaks were formed in a part of the blotted image.

C: White streaks were formed on the whole blotted image, and blotted image was harsh.

Evaluation B2: Test on Feathering

Characters in 4 point, 10 point, and 20 point and a full density blotted image of 50 point in length and 200 point in breadth were printed on the following printing papers. The prints thus obtained were tested for feathering at the edge of the characters and the blotted images, and the results were evaluated according to the following criteria. The following five printing papers generally called plain paper were used as the printing paper.

Xerox P (a product of Xerox Corp.)

Xerox 4024 (a product of Xerox Corp.)

Xerox R (a product of Xerox Corp.)

Ricopy 6200 (a product of Ricoh Co., Ltd.)

Neenah Bond (a product of Kimberly-Clark)

Evaluation Criteria

A: Irrespective of the type of paper, prints were free from feathering and had good quality.

B: For some type of paper, feathering occurred.

C: Irrespective of the type of paper, feathering occurred in all of the evaluation papers.

TABLE 2

| Example/Evaluation test | B1 | B2 |
| --- | --- | --- |
| Example B1 | A | A |
| Example B2 | A | A |
| Example B3 | A | A |
| Example B4 | A | A |
| Comparative Example B1 | B | B |
| Comparative Example B2 | B | B |

What is claimed is:

1. A process for producing a pigment dispersion, comprising the steps of:

providing a mixture consisting essentially of a pigment, a dispersant, a polysiloxane surfactant and/or an alkanediol, a polyhydric alcohol other than the alkanediol, and water; and dispersing the mixture to produce the pigment dispersion.

2. The process according to claim 1, wherein the polysiloxane surfactant is represented by formula (I) or (II):

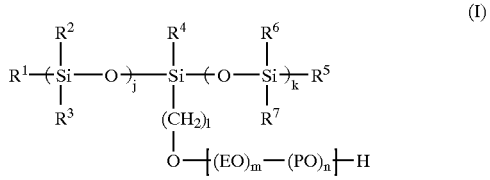

wherein $R^1$ to $R^7$ each independently represent a $C_{1-6}$ alkyl group, j, k, and l are each independently an integer of 1 or more, EO represents an ethyleneoxy group, PO represents a propyleneoxy group, m and n are an integer of 0 (zero) or more, provided that m+n is an integer of 1 or more, and EO and PO may be arranged, regardless of order in the brackets of formula (I), randomly or as blocks joined together; or

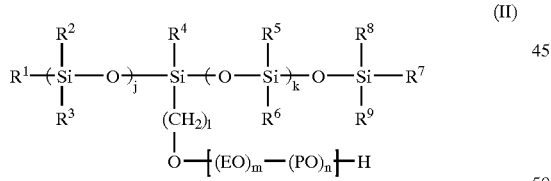

wherein $R^1$ to $R^9$ each independently represent a $C_{1-6}$ alkyl group, j, k, and l are each independently an integer of 1 or more, EO represents an ethyleneoxy group, PO represents a propyleneoxy group, m and n are an integer of 0 (zero) or more, provided that m+n is an integer of 1 or more, and EO and PO may be arranged, regardless of order in the brackets of formula (II), randomly or as blocks joined together.

3. The process according to claim 1, wherein the amount of the polysiloxane surfactant added is 0.03 to 3% by weight based on the total amount of the pigment dispersion.

4. The process according to claim 1, wherein the alkanediol is a 1,2-alkanediol.

5. The process according to claim 4, wherein the 1,2-alkanediol is 1,2-hexanediol.

6. The process according to claim 1, wherein the amount of the alkanediol added is 0.5 to 20% by weight based on the total amount of the pigment dispersion.

7. The process according to claim 1, wherein the dispersant is a polymeric compound having an average molecular weight of 3,000 to 30,000.

8. The process according to claim 1, wherein the polyhydric alcohol is selected from the group consisting of ethylene glycol, diethylene glycol, glycerin, and mixtures thereof.

9. An ink composition comprising the pigment dispersion produced by the process according to claim 1.

10. A process for producing an ink composition, comprising the steps of:

providing a mixture consisting essentially of a pigment, a dispersant, a polysiloxane surfactant and/or an alkanediol, a polyhydric alcohol other than alkanediol, and water;

dispersing the mixture to prepare a pigment dispersion; and mixing the pigment dispersion with a member selected from the group consisting of water, a surfactant, a wetting agent, a pH adjustor, and mixtures thereof.

11. The process according to claim 10, wherein a polysiloxane surfactant and/or an alkanediol is further added to the pigment dispersion.

12. The process according to claim 10, wherein a polysiloxane surfactant is represented by formula (I) or (II)

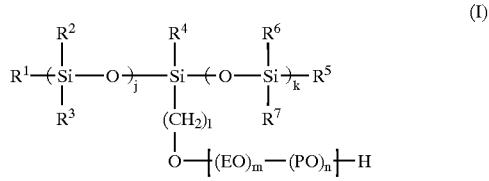

wherein $R^1$ to $R^7$ each independently represent a $C_{1-6}$ alkyl group, j, k, and l are each independently an integer of 1 or more, EO represents an ethyleneoxy group, PO represents a propyleneoxy group, m and n are an integer of 0 (zero) or more, provided that m+n is an integer of 1 or more, and EO and PO may be arranged, regardless of order in the brackets of formula (I), randomly or as blocks joined together; or

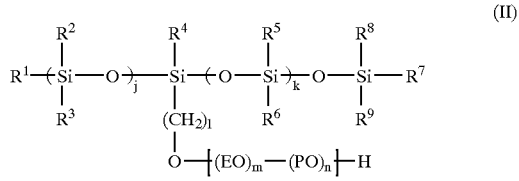

wherein $R^1$ to $R^9$ each independently represent a $C_{1-6}$ alkyl group, j, k, and l are each independently an integer of 1 or more, EO represents an ethyleneoxy group, PO represents a propyleneoxy group, m and n are an integer of 0 (zero) or more, provided that m+n is an integer of 1 or more, and EO and PO may be arranged, regardless of order in the brackets of formula (II), randomly or as blocks joined together.

13. The process according to claim 10, wherein the amount of the polysiloxane surfactant added is 0.01 to 3% by weight based on the total amount of the ink composition.

14. The process according to claim 10, wherein the alkanediol is a 1,2-alkanediol.

15. The process according to claim 14, wherein the 1,2-alkanediol is 1,2-hexanediol.

16. The process according to claim 10, wherein the amount of the alkanediol added is 0.1 to 20% by weight based on the total amount of the ink composition.

17. The process according to claim 10, wherein the dispersant is a polymeric compound having an average molecular weight of 3,000 to 30,000.

18. The process according to claim 10, wherein the polyhydric alcohol is selected from the group consisting of ethylene glycol, diethylene glycol, glycerin, and mixtures thereof.

19. An ink composition produced by the process according to claim 10.

20. An ink jet recording method comprising the step of ejecting the ink composition according to claim 19 onto a recording medium to form print theron.

21. A recorded medium comprising a print produced by the recording method according to claim 20.

22. In a process for producing an ink composition comprising a pigment, a dispersant, water and another component or components, wherein a pigment dispersion comprising the pigment, the dispersant and water is formed in an initial step and the pigment dispersion so formed is then mixed with the other component or components, the improvement comprising forming the pigment dispersion in the initial step in the presence of (a) a polysiloxane surfactant and/or an alkanediol, and (b) a polyhydric alcohol other than the alkanediol, and then and only then mixing the pigment dispersion with the other component or components to form the ink composition.

23. The process according to claim 22, wherein the other component or components are selected from the group consisting of more water, a surfactant, a wetting agent, a pH adjustor, and mixtures thereof.

* * * * *